United States Patent [19]

York et al.

[11] 4,056,427

[45] Nov. 1, 1977

[54] FOCUS COLLIMATOR PRESS FOR A COLLIMATOR FOR GAMMA RAY CAMERAS

[75] Inventors: Richard N. York; David L. York, both of Lockport, Ill.

[73] Assignee: Precise Corporation, Lockport, Ill.

[21] Appl. No.: 705,046

[22] Filed: July 14, 1976

Related U.S. Application Data

[62] Division of Ser. No. 608,071, Aug. 27, 1975, abandoned.

[51] Int. Cl.² ............................................. B23K 27/00
[52] U.S. Cl. .................................... 156/580; 156/563; 29/238
[58] Field of Search ................... 29/238; 156/580, 563

[56] References Cited

U.S. PATENT DOCUMENTS

| 2,970,373 | 2/1961 | Kohl | 29/238 |
| 3,379,594 | 4/1968 | Bruder | 156/580 |

Primary Examiner—James L. Jones, Jr.
Attorney, Agent, or Firm—Ernest Kettelson

[57] ABSTRACT

A focus collimator press for collimators for gamma ray cameras, comprising a pivot arm of fixed length mounted on a travelling pivot which is movable in the plane of a spaced apart work table surface in a direction toward and away from the work table. A press plate is carried at the opposite end of the fixed length pivot arm, and is maintained in registration with the same portion of the work table for pressing engagement with each undulating radiation opaque strip as it is added to the top of a collimator stack in process by movement of the travelling pivot inward toward the work table. This enables the press plate to maintain its relative position above the collimator stack and at the same time the angle of the press plate changes, becoming less acute in relation to the work table as the travelling pivot moves inwardly toward the work table. The fixed length of the pivot arm is substantially equal to the focal point of the converging apertures formed by each pair of undulating strips stacked together. Thus, the focal point of each aperture row falls substantially on the axis of the travelling pivot, and since it moves in the plane of the work table surface the focal point of each aperture row is directed to lie in the same common plane. When one of two collimator stacks made in this way is rotated 180 degrees and the two bonded together along their respective first strips, all focal points of every aperture row lie on the central axis of the completed collimator.

2 Claims, 23 Drawing Figures

FOCUS COLLIMATOR PRESS FOR A COLLIMATOR FOR GAMMA RAY CAMERAS

RELATED APPLICATIONS

This application is a division of co-pending application Ser. No. 608,071, filed Aug. 27, 1975, abandoned.

BACKGROUND OF THE INVENTION

This invention relates to the field of collimators for use in cameras of the radiation or gamma ray type. A subject to be investigated is infused with a radioactive substance which emits radioactive or gamma rays. The camera includes a transducer to receive the gamma rays and record an image therefrom. In order for the image to be a true representation of the subject being investigated, a collimator having collimating apertures is positioned between the transducer and the subject to screen out all of the radioactive rays except those directed along a straight line through the collimating apertures between a particular part of the subject and a corresonding particular part of the transducer. The collimator is made of a radiation opaque material such as lead, and collimating apertures have been formed therein by various means such as drilling holes therethrough. Another construction previously known was to sandwich corrugated strips of lead foil between flat strips, much the same as corrugated cardboard construction. When attempting to make a focusing collimator using the sandwiched corrugated strip type of construction, one of the problems was inability to make all the rows of apertures focus at a point axially aligned with the central axis of the collimator. In such construction, each corrugated strip was substantially identical. The apertures of each row would focus at a common point the same distance from the strip, and if merely stacked one on top of the other, the focal points of each row would be spaced apart in vertical alignment the same distance in front of the collimator rather than focusing at a point in axial alignment with the central axis of the collimator. In an attempt to partially solve this problem, one end of a telescoping arm was hinged on a pivot point representing a common focal point in axial alignment with the central axis of the collimator. On the other end of the telescoping arm, a weighted forming block was positioned to bear against the top of each sandwiched row of corrugated strips as one was laid on top of the other to make the collimator. As pressure was applied to the weighted forming block, each row was tilted slightly to direct its apertures toward the pivot point on which the telescoped arm was hinged representing a centrally disposed focal point axially aligned with the central axis of the collimator. However, if the pivot point was spaced far enough from the central axis of the collimator for the focal point of the central or middle row apertures to coincide therewith, then since the focal point of every row of apertures is the same distance from its respective corrugated strip, the top most row would come to its focal point before reaching the pivot point on which the telescoped arm was hinged. The same would be true of the bottom most row, and of each row between the central one and those above or below. As a result, the focal points of each row of apertures would still be spaced apart in a vertical plane rather than focusing on points in axial alignment with the central axis of the collimator.

SUMMARY OF THE INVENTION

It is an object of the invention to provide a collimator for gamma ray cameras having collimating apertures formed by stacked lead foil strips having alternating first projections extending in one direction and second projections extending in the opposite direction, the first projections of one strip being bonded to respective corresponding second projections of an adjacent strip to form said collimating apertures.

It is an object of the invention to provide a collimator for gamma ray cameras having collimating apertures in which said apertures are symmetrical.

It is an object of the invention to provide a collimator for gamma ray cameras of the type in which all apertures focus on a line in axial alignment with the central axis of the collimator.

It is an object of the invention to provide a collimator press for making collimators of the type in which all apertures focus on a line in axial alignment with the central axis of the collimator, including a press arm of fixed length having a press forming block at one end positioned to engage an edge of the collimator and being pivotally mounted at the other end to reciprocally moveable pivot means, the pivot means being moveable forward and back on a line parallel to an extension of the central axis of the collimator.

DESCRIPTION OF PREFERRED EMBODIMENT

Figure 1:
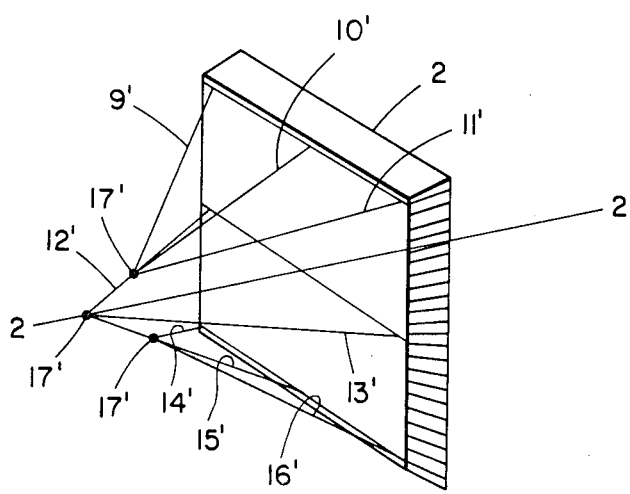
FIG. 1 is a perspective view of a collimator of the prior art type with collimating apertures which fail to focus on a line in axial alignment with the central axis of the collimator.
Figure 2:
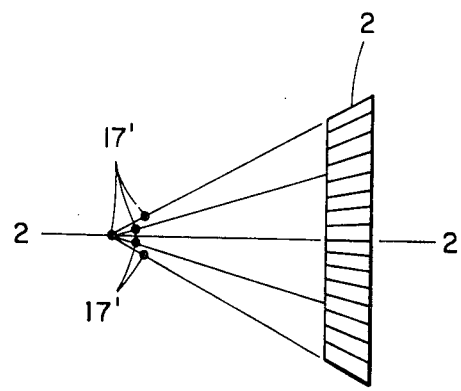
FIG. 2 is a side elevation view of the prior art collimator shown in FIG. 1.
Figure 3:
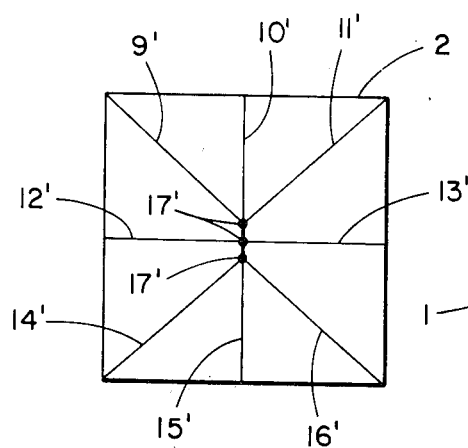
FIG. 3 is a front elevation view of the prior art collimator shown in FIGS. 1 and 2.
Figure 4:
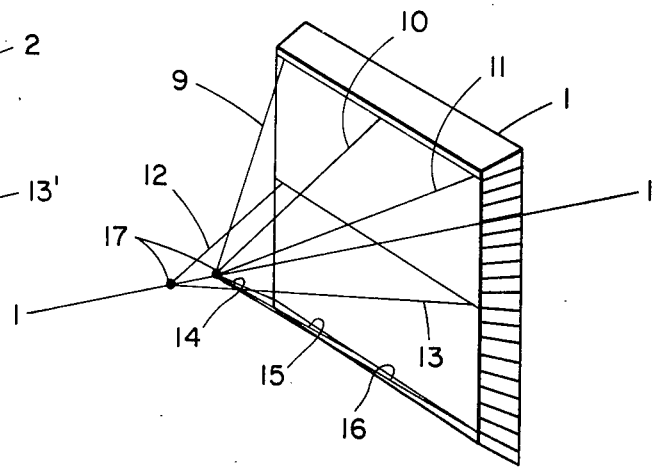
FIG. 4 is a perspective view of a collimator in accordance with this invention, with collimating apertures shown to focus on a line in axial alignment with the central axis of the collimator.
Figure 5:
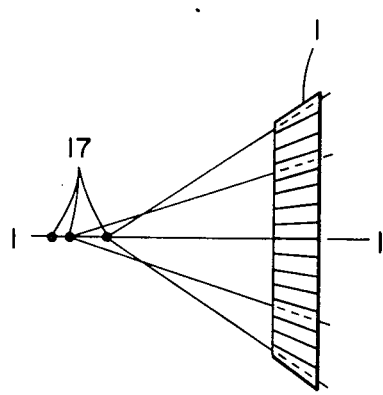
FIG. 5 is a side elevation view of the collimator shown in FIG. 4.
Figure 6:
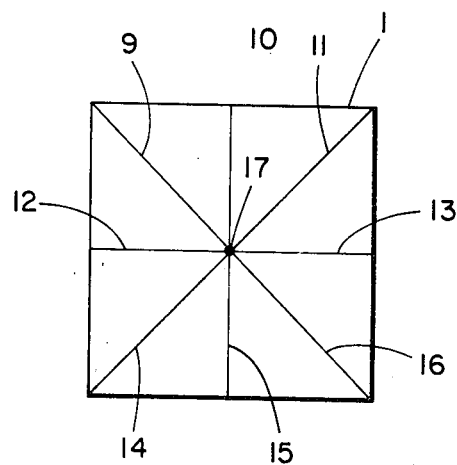
FIG. 6 is a front elevation view of the collimator shown in FIGS. 4 and 5.
Figure 7:
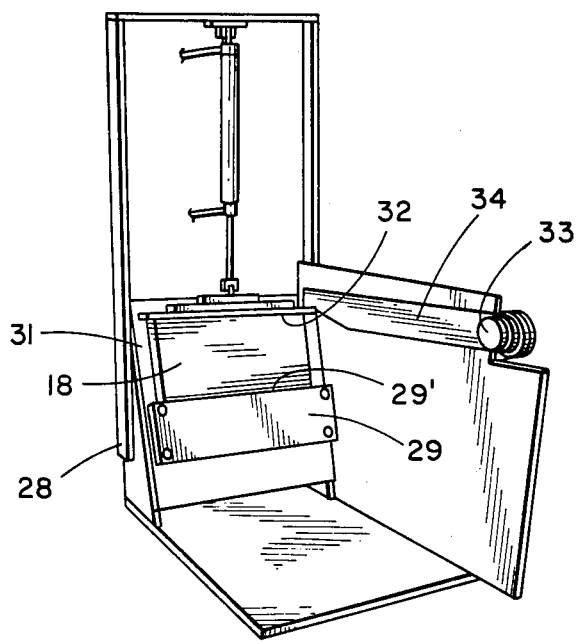
FIG. 7 is a perspective view of a collimator press in accordance with this invention.
Figure 8:
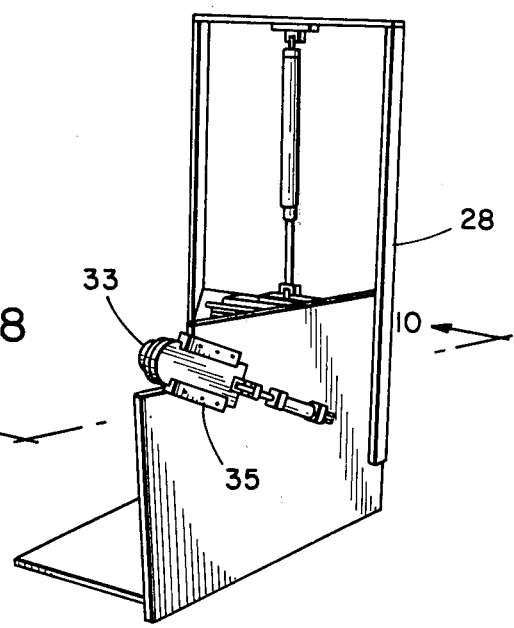
FIG. 8 is a perspective view of the collimator press shown in FIG. 7 taken from a different angle.
Figure 9:
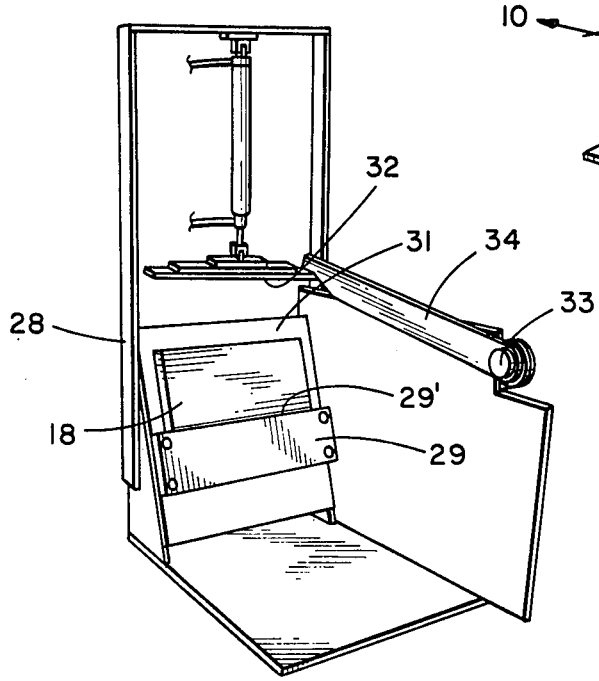
FIG. 9 is a perspective view of a collimator press shown with the press block in an elevated position.
Figure 10:
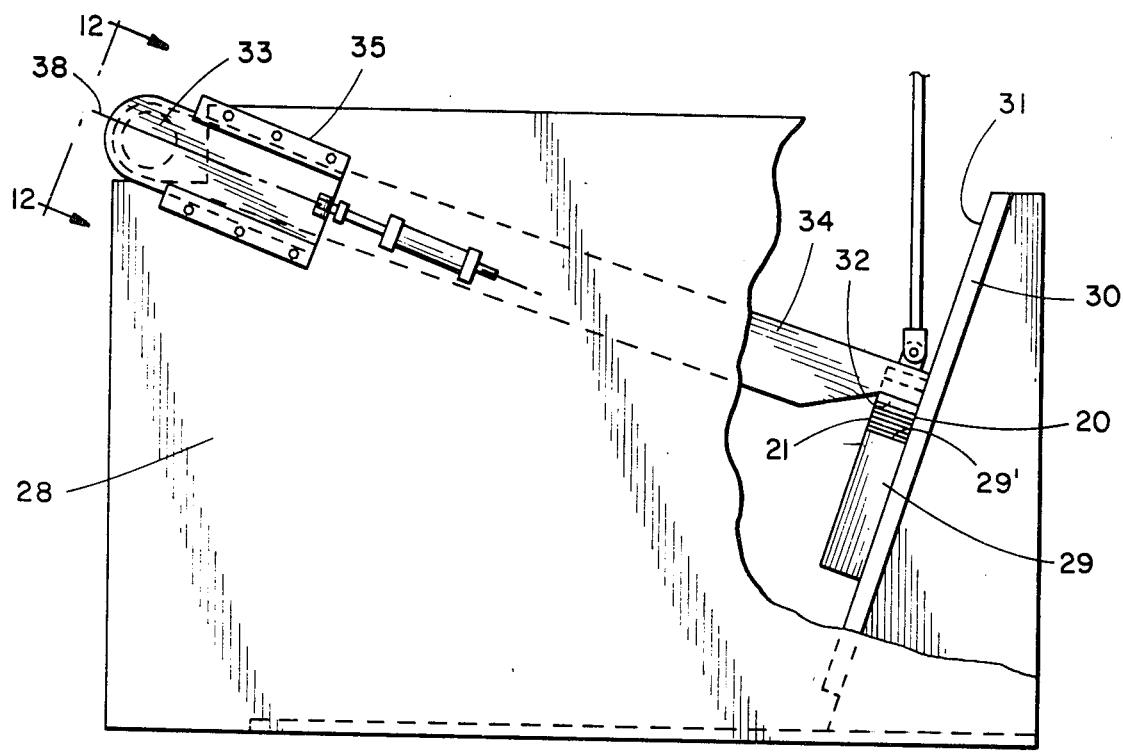
FIG. 10 is a partial section view taken on line 10 — 10 of FIG. 8 showing the initial rows of contoured lead foil strips being stacked in place on a collimator under construction.
Figure 11:
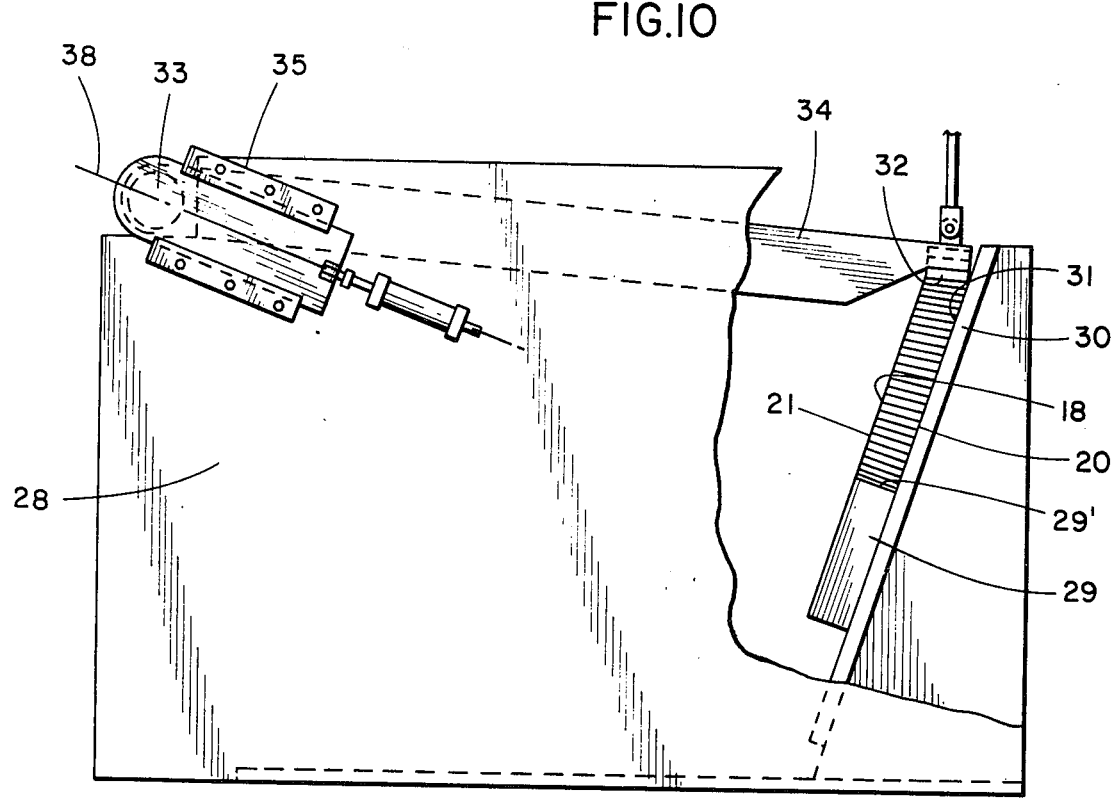
FIG. 11 is a partial section view as shown in FIG. 10 but with a number of additional rows of contoured lead foil strips stacked in place on a collimator under construction.
Figure 12:
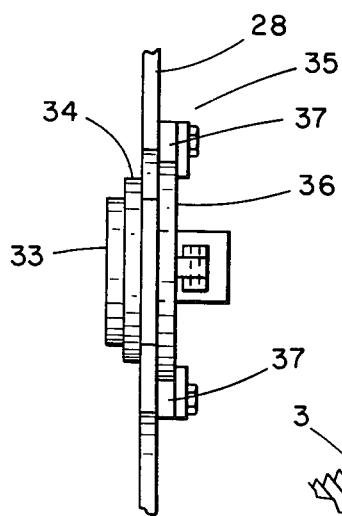
FIG. 12 is an end view of a press pivot arm in accordance with this invention taken from line 12 — 12 of FIG. 10.

An axially focused foil strip collimator 1 in accordance with this invention is shown in FIGS. 4 - 6 in perspective, side elevation and plan views respectively. To illustrate the advance over the prior art more clearly, a prior art foil strip collimator 2 which does not focus axially is shown in FIGS. 1 - 3 in similar perspective, side elevation and plan views respectively.

The central axis of axially focused collimator 1 is designated by the line 1 — 1 and the central axis of prior art collimator 2 is designated by the line 2 — 2.

Figure 15:
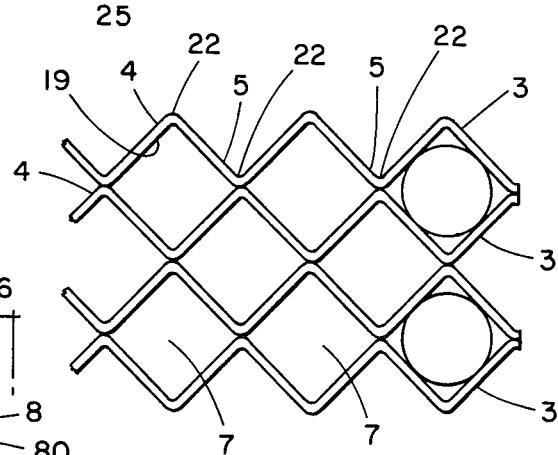
FIG. 15 is a front elevation close-up view showing a fragment of a collimator in accordance with this invention with the apertures enlarged.
Figure 14:
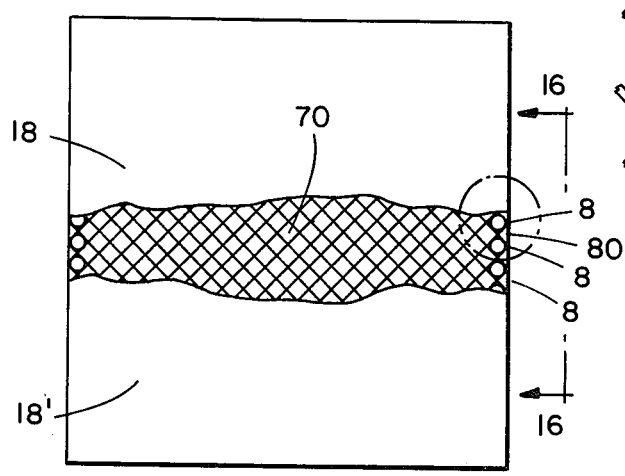
FIG. 14 is a front elevation view of a collimator in accordance with this invention showing details of a portion of the apertures and positioning pegs mounted in apertures along opposite edges.
Figure 16:
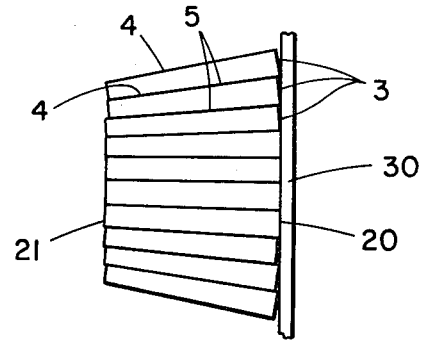
FIG. 16 is a side elevation view of a collimator partially constructed in accordance with this invention, taken from line 16 — 16 of FIG. 14.
Figure 17:
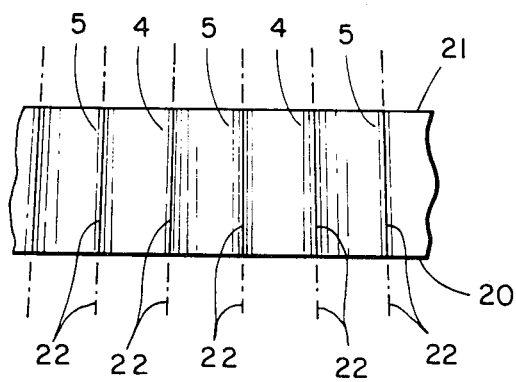
FIG. 17 is a plan view of a portion of the sinuously contoured lead foil strip of the collimator fragment shown in FIG. 15.

Axially focused collimator 1 comprises a plurality of stacked strips 3 of radiation opaque material such as lead foil, having a continuously sinuous or undulating configuration with alternating first projections 4 extending in one direction and second projections 5 extending in the opposite direction. The undulating strips 3 may be of a virgin lead foil composition with about 4% antimony approximately 0.008 to 0.010 inches thick and approximately 1.6 inches wide. An enlarged fragment of axially focused collimator 1 is illustrated in FIG. 15 showing one type of continuously undulating lead foil strips, and in FIG. 21 which illustrates another type of such strips used in accordance with this invention. Each successive undulating strip 3 in the stack is placed directly in contact with adjacent undulating strips 3 and bonded thereto by a suitable adhesive, without the need of a separate supporting strip interleaved between each corrugated or undulating strip.

Figure 18:
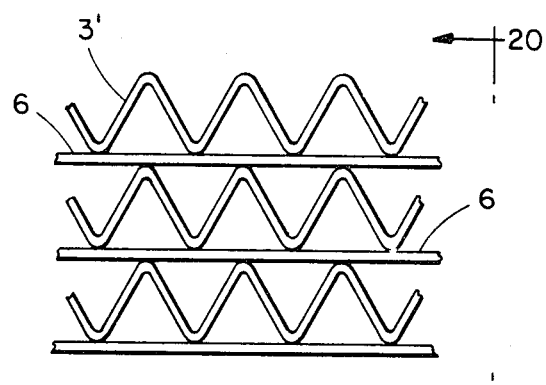
FIG. 18 is a front elevation close-up view of a fragment of a collimator of the type previously known.
Figure 20:
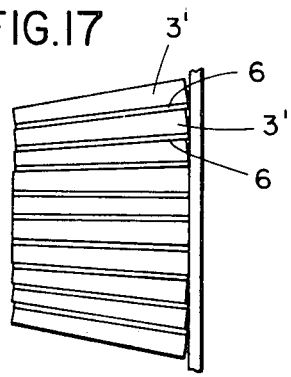
FIG. 20 is an end elevation view taken from line 20 — 20 of FIG. 18.
Figure 19:
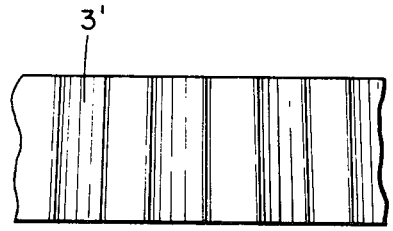
FIG. 19 is a plan view of the fragment shown in FIG. 18.

FIG. 18 illustrates a prior art collimator fragment of the foil strip type which utilizes a separate flat supporting strip 6 between each corrugated strip 3'.

Figure 21:
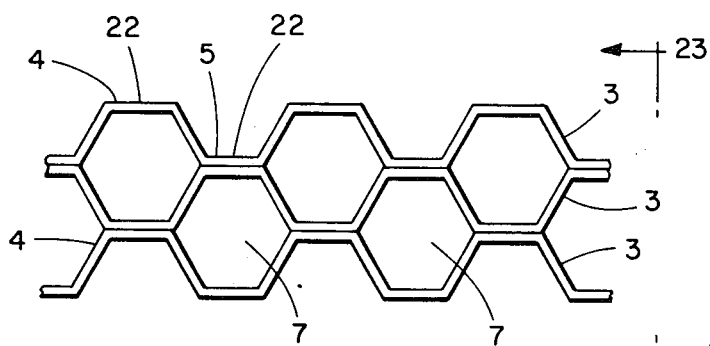
FIG. 21 is a front elevation close-up view of a fragment of a collimator in accordance with this invention.
Figure 23:
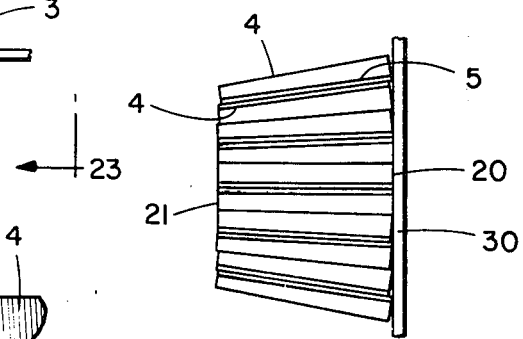
FIG. 23 is a side elevation view of the collimator fragment of FIG. 21, taken from line 23 — 23.
Figure 22:
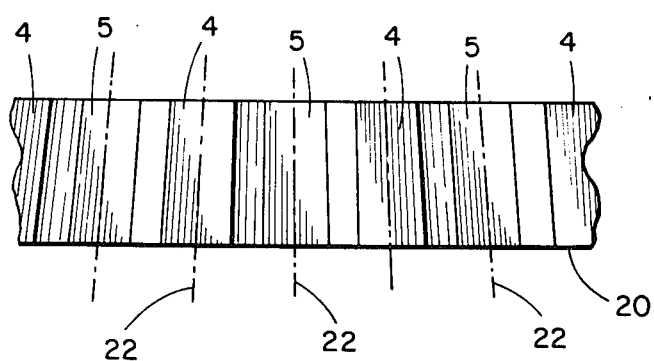
FIG. 22 is a plan view of a portion of the sinuously contoured lead foil strip of the collimator fragment shown in FIG. 21.

As seen in FIGS. 15 and 21, the stacked undulating strips 3 provide substantially symmetrical apertures 7 formed between the first projections 4 of each strip 3 which overlays another strip and the corresponding second projections 5 of each strip 3 which underlays another strip in the stack. The illustrations in FIGS. 15 and 21 are enlarged to show the apertures 7 arranged in aperture rows 8 between stacked foil strips 3. In actual size the apertures are quite small, approximately 0.10 to 0.14 inches across.

The collimator shown in FIGS. 4 - 6 is reduced in size so the apertures cannot be graphically illustrated. The extended axes through representative apertures are shown designated by reference numbers 9 - 16. Extended axes 9 - 11 extend from the top row of apertures in the collimator shown in FIG. 4, extended axis 9 from the aperture farthest to the left in such row, extended axis 10 from the center aperture in such row and extended axis 11 from the aperture farthest to the right. Extended axes 12 - 13 extend from the middle row of apertures in such collimator, the one designated 12 from the aperture farthest to the left and the one designated 13 from the aperture farthest to the right. Extended axes 14 - 16 extend from the bottom row of apertures, extended axis 14 from the aperture farthest to the left in such row, the one designated 15 from the aperture in the middle of such row, and the one designated 16 from the aperture farthest to the right in such row.

The corresponding extending axes 9' - 16' of the prior art collimator 2 are illustrated in FIGS. 1 - 3. Comparison of the prior art collimator 2 which is not axially focused with axially focused collimator of this invention will more clearly illustrate one of the basic differences.

The focal points 17 of each aperture row 8 of the present invention are the same distance from the center aperture of each respective row and on the extended axis of the center aperture of such row. The axes of all center apertures in the plurality of aperture rows of the collimator 1 lie in a common vertical plane, so the focal points 17 of each aperture row 8 will lie in such common vertical plane also.

In accordance with this invention, each successive undulating lead foil strip of the upper first collimator half 18 is laid on top of an adjacent underlying strip 3 in such a way that the inner surfaces 19 of first projections 4 are directed to taper downwardly so the focal point 17 of the aperture row 8 formed by such strip 3 lies at a point on the extended axis of the center aperture 70 of the middle aperture row 80 of the completed collimator with both halves 18 and 18' joined together. When the upper first collimator half 18 is completed, a second collimator half 18' is completed in the same way. The second half 18' is rotated 180° on its central axis so the previously bottom strip 3 is facing upwardly for adhesively bonding together with the corresponding bottom of first strip 3 of the upper first collimator half 18.

As shown in FIG. 6, from a front elevation view the focal points 17 of all aperture rows 8 come together at a point, the point being an imaginary end view of the central axis 1 — 1 of collimator 1. By contrast, the focal points 17' of prior art collimator 2 come together on a vertical line viewed from the front as illustrated in FIG. 3 and do not focus on its central axis 2 — 2.

Each undulating lead foil strip 3 is formed by placing between forming dies of the size and configuration desired. The undulating strips 3 used in making the axially focused collimator 1 in accordance with this invention are substantially rectangular in plan configuration having two relatively long opposite side edges 20 and 21 which are substantially parallel. The mid-lines 22 of each respective first projection 4 and second projection 5 converge in the direction from side edge 20 to side edge 21, and are directed toward the focal point 17 of aperture row 8 which will be formed when a similar undulating strip 3 is adhesively bonded thereto.

Figure 13:
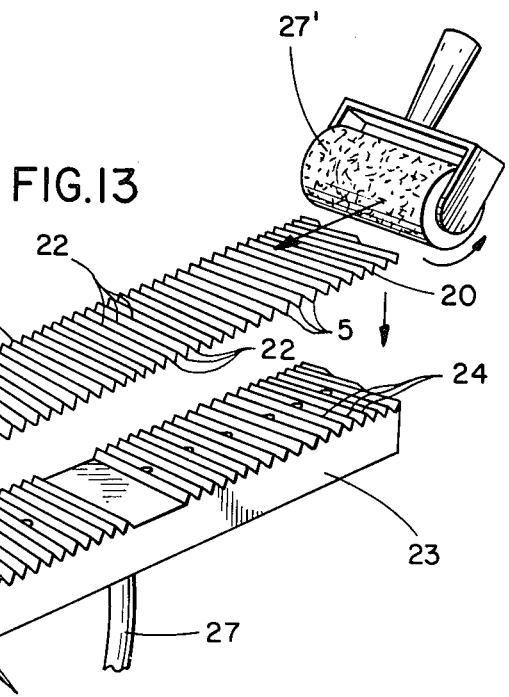
FIG. 13 is an exploded view of a sinuously contoured lead foil strip positioned for mounting on a vacuum chuck preparatory to applying an adhesive.

A vacuum chuck 23 is provided having alternately projecting peaks 24 and valleys 25 corresponding to the first projections 4 and second projections 5 respectively of the undulating strips 3, and spaced apart vacuum ports 26. The vacuum chuck 23 is utilized for handling the undulating lead foil strips 3 after they have been formed and shaped to the desired configuration, and to prevent deforming or bending out of the precise shape required to enable the built-up collimator 1 to be focused on its central axis when completed. The vacuum ports 26 open from a central cavity in communication with a flexible pneumatic tube 27 which is connected to a vacuum creating source not shown. When an undulating strip 3 is placed on vacuum chuck 23, the vacuum source is actuated to create a vacuum at ports 26 thereby holding undulating strip 3 securely in place. While supported thereon, the strip 3 is coated with an epoxy or other suitable adhesive by means of roller 27' as shown in FIG. 13a. The vacuum chuck 23, while still holding the undulating strip 3 thereto, may be moved to place the strip 3 in position above a coresponding strip for bonding thereto as the collimator 1 is being built up. The flexible tube 27 is sufficiently long to permit such movement. The first projections 4 of the strip held by vacuum chuck 23 are placed to engage second projections 5 of the collimator strip to which it will be adhesively bonded, after which the vacuum chuck 23 releases the undulating strip 3.

The axially focused collimator 1 is assembled on a layup press 28 illustrated in FIGS. 7 – 11. As previously stated, the collimator is assembled in two halves, an upper first collimator half 18 which when completed is rotated 180° for assembly with the second collimator half 18'. A first undulating lead foil strip 3, after being formed as described above, is placed on the work table 29 of lay-up press 28. A second strip 3 is grasped by vacuum chuck 23, epoxy or other suitable adhesive is applied, and the second strip is laid over the first with respective converging mid-lines 22 of first projections 4 of the second strip being laid over the corresponding converging mid-lines 22 of second projections 5 of the first strip. Successive additional strips 3 are laid up in the same manner over a previously added strip 3, with corresponding first projections 4 of each strip facing corresponding second projections 5 of adjacent strips.

The lay-up press 28 includes an alignment wall 30 which extends upward at a right angle from the surface 29' of work table 29, and at an incline to permit the weight of the collimator stack of laid-up strips 3 to keep side edges 20 of the strips 3 bearing against the face 31 of alignment wall 30. Thus, as the undulating strips 3 are stacked to assemble the collimator, the side edges 20 are kept in alignment as the stack is built up. The undulating lead foil strips 3 are of equal width, so the opposite side edges are thus also kept in alignment.

As each undulating lead foil strip 3 is laid up on another strip 3 in the stack, the press plate 32 may be pressed thereagainst from the top to urge it into more secure engagement with the underlying strip 3 and to angularly direct the midline 22 of first and second projections 4 and 5 of such strip toward the pivot 33 of pivot arm 34 which carries press plate 32 at one end thereof. Accordingly, the extended axes of apertures 7 of aperture row 8 formed by placing said undulating strip 3 over an underlying strip 3 are directed to intersect the pivot axis of pivot 33.

The pivot arm 34 is of a specified fixed length, so the distance between pivot 33 and press plate 32 does not vary as additional strips 3 are added to build up the collimator stack. The specified length is equal to the distance of focal point 17 of each aperture row 8 from its center aperture. A travelling pivot assembly 35 is provided, including a pivot bearing plate 36 slidably mounted between rails 37 along the side of the press 28 with its longitudinal axis 38 directed to the surface 29' of work table 29. The longitudinal axis 38 lies substantially in the same plane as surface 29'. Thus as travelling pivot assembly 35 slides back and forth carrying pivot 33 between an extended and drawn-in position, the pivot axis of pivot 33 is retained in substantially the same plane as surface 29' of work table 29. The face 39 of press plate 32, which bears against the top portions of undulating strips 3 during each pressing and angular directing operation, lies in a plane parallel to an extended radius extending from the axis of pivot 33 toward face 39, and said plane is spaced from such parallel extended radius a distance equal to the distance between mid-line 22 of first projections 4 and midline 22 of second projection 5 of the undulating lead foil strips 3. Accordingly, when the first strip 3 is laid on the work table 29 with mid-lines 22 of second projections 5 resting against surface 29' and press plate 32 is brought into pressing engagement with its face 39 bearing against mid-lines 22 of first projections 4 of the strip, at such time and said extended radius of the pivot axis of pivot 33 lies in the same plane as the surface 29' and face 39 of press plate 32 is spaced therefrom the stated distance in parallel relation therewith.

When successive undulating strips 3 are laid-up on the stack and press plate 32 is brought into pressing and angular directing engagement therewith, the distance from the original pivot point increases as the pivot angle increases. Since pivot arm 34 is of fixed length, the pivot 33 must be drawn inwardly toward the collimator stack. The travelling pivot assembly 35 is accordingly moved inwardly between rails 36 carrying pivot 33 inwardly on a line which is coplanar with the surface 29' of work table 29, to enable face 39 of press plate 32 to completely overlie each strip 3 as the collimator stack builds up. Since the face 39 lies in a plane just slightly spaced apart from the extended radius of the pivot axis of pivot 33 and parallel thereto, each indulating lead foil strip is angularly directed toward such picot axis when face 39 of press plate 32 is brought into pressing engagement thereagainst. Thus when the upper first collimator half 18 is completed, the extended axes of each aperture 7 in each aperture row 8 are directed to intersect the plane of surface 29' of work table 29. The length of pivot arm 34 being equal to the distance of focal point 17 from the center aperture of its respective aperture row 8, the focal point 17 of each aperture row 8 therefore lies at the point of intersection with the plane of surface 29'.

The second collimator half 18' is assembled in the same way and the two halves joined. The first half 18 is rotated 180° from its original stacking position so its previous bottom strip will face the corresponding bottom strip of the second collimator half 18'. The two are then adhesively bonded together to complete the axially focused collimator 1. The original bottom strip of each half was directed parallel to the surface 29' of work table 29 during the stacking, pressing and angular directing operation. Thus when joined, the original bottom undulating strips 3 form the middle aperture row 80, and the extended axes of the apertures 7 in such row lie in a plane which extends from the mid-line between the two halves 18 and 18' perpendicular to the face of the completed collimator 1. The axis of center aperture 70 of middle aperture row 80 becomes the central axis 1

— 1 of the collimator, which also lies in the said perpendicular mid-line plane.

During the pressing and angular directing operation, each successive strip 3 was angularly directed so the focal points 17 of each aperture row 8 lie at the respective points of intersection with the plane of surface 29' of work table 29. Since the focal points 17 of each aperture row 8 also lie in a common vertical plane through the center apertures of each aperture row, they accordingly lie at points of intersection with the plane of surface 29' which are on the central axis 1 — 1 of the completed collimator.

The pressing and angular directing operation of press plate 32 against the undulating strips 3 may be performed for each strip at the time it is added to the stack, or it may be performed once for several strips after the several strips have been laid up on the stack. The press is able to exert sufficient pressure to angularly direct several strips at one time so extended axes of the aperture rows 8 formed thereby are directed angularly toward the pivotal axis of pivot 33, such pivotal axis lying in the plane of surface 29' of work table 29, whereby such extended axes (equal in length to the pivot arm 34 which in turn is equal in length to the focal points 17 from the center aperture 7 of each respective aperture row 8) intersect the plane of surface 29' and the focal points 17 of such rows lie in such plane at the points of intersection therewith. They will also lie on the central axis 1—1 of the collimator when both halves 18 and 18' are completed and adhesively bonded together in the manner described.

We claim:

1. A focus collimator press, including a work table surface lying in a first plane to receive strips thereon for stacking to form a collimator, a press member spaced from said work table surface movable between an engaged pressing position and a retracted position, said press member including face means for engaging and bearing against each last strip added to said collimator stack, angular directing means to angularly direct said face means in a plane which intersects said first plane a constant fixed distance from said face means when said face means is in bearing engagement against any one of said last strips added to said stack, said constant fixed distance being substantially equal to the distance of the focal point of the row of apertures formed by each strip added to said stack from the midpoint of such strip.

2. A focus collimator press as set forth in claim 1, wherein said angular directing means includes pivot means mounted on said press and having its pivot axis lying in said first plane spaced apart from said work table surface and strips stacked thereon, said pivot means being movable in said plane in a direction toward and away from said work table surface and strips stacked thereon, a pivot arm having a pivot and extending from said pivot, the length of said pivot arm being substantially equal to said constant fixed distance, said press member being mounted on said pivot arm at the end thereof opposite said pivot end, said pivot end of said arm being movable with said pivot in said first plane toward said work table as additional strips are added to the stack for registration of said press plate with each top strip as it is added thereon to be angularly directed by said face means of said press plate, whereby the focal point of each aperture row is directed to lie substantially in said first plane.

* * * * *